United States Patent
Grosch et al.

(10) Patent No.: US 6,689,710 B2
(45) Date of Patent: Feb. 10, 2004

(54) METHOD FOR PRODUCING MULTIMETAL CYANIDE COMPOUNDS

(75) Inventors: Georg Heinrich Grosch, Bad Dürkheim (DE); Dirk Franke, Ludwigshafen (DE); Manfred Munzinger, Dirmstein (DE); Kathrin Harre, Dresden (DE); Eva Baum, Schwarzheide (DE); Michael Stösser, Neuhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/204,367

(22) PCT Filed: Feb. 20, 2001

(86) PCT No.: PCT/EP01/01893

§ 371 (c)(1),
(2), (4) Date: Aug. 20, 2002

(87) PCT Pub. No.: WO01/64772

PCT Pub. Date: Sep. 7, 2001

(65) Prior Publication Data

US 2003/0013604 A1 Jan. 16, 2003

(30) Foreign Application Priority Data

Feb. 29, 2000 (DE) .......................................... 100 09 568

(51) Int. Cl.⁷ .............................................. B01J 27/26
(52) U.S. Cl. ...................................... 502/175; 502/200
(58) Field of Search ................................. 502/175, 200

(56) References Cited

U.S. PATENT DOCUMENTS

| | | | | |
|---|---|---|---|---|
| 4,477,589 A | * | 10/1984 | van der Hulst et al. | .... 502/169 |
| 4,843,054 A | * | 6/1989 | Harper | ........................ 502/175 |
| 5,158,922 A | * | 10/1992 | Hinney et al. | .............. 502/175 |
| 5,470,813 A | | 11/1995 | Le-Khac | |
| 5,777,177 A | | 7/1998 | Pazos | |
| 5,919,988 A | | 7/1999 | Pazos et al. | |
| 6,018,017 A | | 1/2000 | Le-Khac | |
| 6,391,820 B1 | | 5/2002 | Ooms et al. | |

FOREIGN PATENT DOCUMENTS

| | | |
|---|---|---|
| DE | 19834572 A1 | 2/2000 |
| EP | 0755716 A1 | 1/1997 |
| WO | WO97/23544 | 7/1997 |
| WO | WO 01/04183 A1 | 1/2001 |

OTHER PUBLICATIONS

PCT International Search Report Dated Jul. 10, 2001.

* cited by examiner

Primary Examiner—Elizabeth Wood
(74) Attorney, Agent, or Firm—Fernando A. Borrego

(57) ABSTRACT

A process for preparing multimetal cyanide compounds by reacting a metal salt with a cyanometalate compound comprises the steps a) precipitation of the multimetal cyanide compound by reaction of a metal salt with a cyanometalate compound and b) recrystallization of the multimetal cyanide compound precipitated in step a).

5 Claims, No Drawings

METHOD FOR PRODUCING MULTIMETAL CYANIDE COMPOUNDS

The invention also provides DMC catalysts which can be prepared by the process of the present invention.

Furthermore, the invention provides for the use of the DMC catalysts prepared by the process of the present invention for the ring-opening polymerization of alkylene oxides and also provides a process for preparing polyether alcohols by ring-opening polymerization of alkylene oxides using the DMC catalysts of the present invention.

The DMC catalysts prepared by the process of the present invention are weakly agglomerated if at all and have a high catalytic activity. For the purposes of the present invention, agglomeration is the assembly of primary particles to form secondary particles. The size and habit of the primary particles can be determined, for example, by means of scanning electron micrographs. Scanning electron micrographs also provide initial information on the agglomeration of the primary particles.

For the purposes of the present invention, solids are regarded as agglomerated if more than 50% of the secondary particles present in the solid consist of more than 20–30 primary particles. For the present purposes, solids are weakly agglomerated if more than 50% of the secondary particles consist of less than 10 primary particles.

One possible way of obtaining information on the state of agglomeration of solids is to combine scanning electron micrographs with particle size measurement by means of laser light scattering. The sizes of the primary crystallites can be determined very well from scanning electron micrographs. On the other hand, the size of the secondary particles can be readily determined by laser light scattering. Solids are then considered as not agglomerated or only weakly agglomerated when the mean secondary particle size determined by laser light scattering (X50 value) differs from the sizes of the primary particles by a factor of less than 10.

For the purposes of the present invention, a primary crystallite or primary particle is the individual crystallite which can be seen, for example, on scanning electron micrographs. These primary particles can then be assembled to form agglomerates, namely the secondary particles.

The process of the present invention in which the multimetal cyanide compounds having the desired crystal structure are not precipitated directly but instead are produced by a precipitation cyanometalate solution to the metal salt solution under high-shear stirring.

This high-shear stirring possibly has the effect, inter alia, of breaking agglomerates which form during the precipitation.

The agglomeration of the DMC catalysts should be suppressed as far as possible, since the reduction in the number of active centers in the DMC catalysts caused by the formation of agglomerates is assumed to be a possible cause of the secondary reactions which occur.

Precipitation under high-shear stirring is technically extremely complicated and problematical, particularly with a view to a reproducible, good quality of the catalyst, in the case of large batches as are necessary in the industrial preparation of the DMC catalysts. Precipitation under high-shear stirring is particularly problematical when crystalline solids having a high degree of crystallinity are to be obtained instead of amorphous materials.

It is an object of the present invention to provide multimetal cyanide catalysts which are not agglomerated or only weakly agglomerated, without complicated technical solutions being necessary. In particular, multimetal cyanide catalysts of the zinc hexacyanocobaltate type having a very good crystal structure should be provided.

We have found that this object is achieved by carrying out the preparation of multimetal cyanide catalysts in two stages, where the first step comprises a reaction stage in which the DMC catalyst after precipitation is initially present as an intermediate which differs from the desired crystal structure, and this intermediate is then converted into the desired crystal structure in a second step. This step in which the DMC catalyst is converted into the desired crystal structure will hereinafter be referred to as recrystallization.

The present invention accordingly provides a process for preparing DMC catalysts by reacting a metal salt with a cyanometalate compound, in which the reaction is carried out in two stages, where the first step initially comprises a reaction stage in which the DMC catalyst is present as an intermediate differing from the desired crystal structure, and this intermediate is then converted into the desired crystal structure in a second step.

Preparation of Multimetal Cyanide Compounds

Multimetal cyanide catalysts, also known as DMC catalysts, are effective catalysts for preparing polyetherols by ring-opening polymerization of alkylene oxides. Multimetal cyanide catalysts can be used in concentrations down to less than 100 ppm in alkylene oxide polymerization. WO 97/23,544 describes catalyst concentrations less than or equal to 15 ppm. However, multimetal cyanide catalyst concentrations of less than 100 ppm very frequently result in problems in the polymerization of the alkylene oxides. Thus, gradual deactivation of the catalyst can occur during the polymerization. In a batch process, significant quality fluctuations of the polyetherols prepared in this way can occur. It is thus possible for different molecular weight distributions, viscosities and contents of unsaturated constituents to be obtained from batch to batch.

A fall-off of the catalyst activity in the polymerization can lead to a complete cessation of the reaction and thus to dangerous situations in the production plants.

A great problem which occurs when using multimetal cyanide catalysts in catalyst concentrations of less than 100 ppm is the formation of a very high molecular weight tail in the polyethers. As described in U.S. Pat. No. 5,919,988, this high molecular weight tail can lead, in critical polyurethane foam formulations, to collapse of the foams.

To avoid or reduce the high molecular weight tail in the polyethers, a number of approaches have been explored. U.S. Pat. No. 5,777,177 describes a specific way of carrying out the polyether synthesis, which is said to be suitable, inter alia, for reducing the proportion of high molecular weight polyether.

In the preparation of multimetal cyanide catalysts, too, there has been no lack of attempts to improve the process for preparing multimetal cyanide catalysts so as to suppress the formation of high molecular weight polyethers when the catalysts are used for the synthesis of polyethers. Thus, U.S. Pat. No. 5,470,813 describes the preparation of improved multimetal cyanide catalysts which are essentially amorphous and are prepared by combining the starting materials for the precipitation under high-shear stirring. An improved embodiment of the process of U.S. Pat. No. 5,470,813 is disclosed in U.S. Pat. No. 5,712,216. Here, an improved multimetal cyanide catalyst is produced by reaction of aqueous cyanometalate and metal salt solutions in the presence of tert-butanol by adding the step and a subsequent recrystallization step enables them to be obtained in weakly agglomerated or unagglomerated form.

The DMC catalysts prepared by the process of the present invention preferably have a crystalline structure and preferably crystallize in a monoclinic crystal system.

The DMC catalysts prepared by the process of the present invention mostly have the formula (I)

$$M^1_a[M^2(CN)_b(A)_c]_d \cdot fM^1_g X_n \cdot h(H_2O) \cdot eL \,(I),$$

where
- $M^1$ is a metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+, Hg2+, Pd2+, pt2+, V2+, Mg2+, Ca2+, Ba2+, Cu2+,
- $M^2$ is a metal ion selected from the group consisting of Fe2+, Fe3+, Co2+, Co3+, Mn2+, Mn3+, V4+, V5+, Cr2+, Cr3+, Rh3+, Ru2+, Ir3+,
- and $M^1$ and $M^2$ are identical or different,
- A is an anion selected from the group consisting of halide, hydroxide, sulfate, carbonate, cyanide, thiocyanate, isocyanate, cyanate, carboxylate, oxalate or nitrate,
- X is an anion selected from the group consisting of halide, hydroxide, sulfate, carbonate, cyanide, thiocyanate, isocyanate, cyanate, carboxylate, oxalate and nitrate,
- L is a water-miscible ligand selected from the group consisting of alcohols, aldehydes, ketones, ethers, polyethers, esters, polyesters, polycarbonate, ureas, amides, nitriles and sulfides,
and
- a, b, c, d, g and n are selected so that the compound is electrically neutral, and
- e is the coordination number of the ligand, a fraction or an integer greater than or equal to 0,
- f is a fraction or integer greater than or equal to 0 and
- h is a fraction or integer greater than or equal to 0, where the multimetal cyanide compounds according to the present invention, of the formula (I), are preferably crystalline.

Preference is here given to crystalline multimetal cyanide compounds in which $M^1$ is Zn(II) and $M^2$ is Co(III). This preferred class of multimetal cyanide compounds will hereinafter be referred to as zinc hexacyanocobaltates.

Within the class of zinc hexacyanocobaltates, there are in turn embodiments of the formula (I) which are particularly preferred.

Particular preference is given to crystalline multimetal cyanide compounds in which the anion X is formate, acetate or propionate and f is then greater than 0 and which have X ray diffraction patterns as are described in DE 197,42,978. Among these compounds, preference is in turn given to those in which the anion X is acetate and in particular to those which crystallize in a monoclinic crystal system.

Among these multimetal cyanide compounds in which $M^1$ is Zn(II), $M^2$ is Co(III), and X is acetate and which have a monoclinic crystal system, there are further preferred embodiments in respect of the morphology of the primary crystals. Preference is given to platelet-shaped multimetal cyanide compounds, i.e. multimetal cyanide compounds in which the length and width of the primary crystallites are at least three times as great as the thickness of the primary crystallites.

As described above, the preparative process of the present invention comprises at least two steps:
(a) precipitation of a multimetal cyanide phase, hereinafter referred to as precursor phase, by reaction of a metal salt with a cyanometalate compound (precipitation step), and
(b) recrystallization of the multimetal cyanide precursor phase to convert it into the desired catalytically active multimetal cyanide phase, which will hereinafter be referred to as catalyst phase (recrystallization step).

For the purposes of the present invention, a multimetal cyanide phase is a multimetal cyanide compound having a particular crystal structure.

The precipitation of the multimetal cyanide precursor phase is carried out, as described in the literature, by combining an aqueous solution of a metal salt $M^1_g X_n$, where $M^1$, X, g and n are as defined for formula I, with an aqueous cyanometalate solution, comprising at least one cyanometalate compound of the formula $B_x[M^2(CN)_b(A)_c]_z$, where B is an alkali metal, an alkaline earth metal and/or hydrogen, $M^2$, A, b and c are as defined for formula I and x and z are numbers greater than zero. B is particularly preferably hydrogen, as described in EP 862,947.

Corresponding to the above-described preferred multimetal cyanide catalyst phases, preferred metal salts are zinc carboxylates, in particular zinc formate, zinc acetate and zinc propionate.

Furthermore, one or both of the aqueous solutions may, if desired, further comprise at least one organic ligand L selected from the above-described classes of substances or as described in WO 98/16,310, page 6, lines 13–26, and/or at least one surface-active substance. The surface-active compounds used can be, in particular, anionic, cationic, nonionic and/or polymeric surfactants.

In particular, use is made of nonionic and/or polymeric surfactants. Among this group, particular preference is given to fatty alcohol alkoxylates, block copolymers of various epoxides having differing hydrophilicity, castor oil alkoxylates or block copolymers of epoxides and other monomers, e.g. acrylic acid or methacrylic acid. The substances used should have a moderate to good solubility in water.

Fatty alcohol alkoxylates used according to the present invention can be prepared by reacting a fatty alcohol, preferably one having 8–36 carbon atoms, in particular 10–18 carbon atoms, with ethylene oxide, propylene oxide and/or butylene oxide. The polyether part of the fatty alcohol alkoxylate used according to the present invention can consist of pure ethylene oxide, propylene oxide or butylene oxide polyethers. Also possible are copolymers of two or three different alkylene oxides or block copolymers of two or three different alkylene oxides. Fatty alcohol alkoxylates which have pure polyether chains are, for example, the Lutensol® AO products from BASF AG. Fatty alcohol alkoxylates having block copolymers as polyether part are Plurafac® LF products from BASF AG. The polyether chains particularly preferably consist of from 2 to 50, in particular 3–15, alkylene oxide units.

Block copolymers as surfactants comprise two different polyether blocks which have differing hydrophilicities. Block copolymers which can be used according to the present invention may comprise ethylene oxide and propylene oxide (Pluronic® products, BASF AG). The solubility in water is controlled via the lengths of the various blocks. The molar masses of these compounds are usually in the range from 500 Da to 20,000 Da, preferably from 1000 Da to 6000 Da and in particular 1500–4000 Da. In the case of ethylene oxide/propylene oxide copolymers, the ethylene oxide content is from 5 to 50% by weight and the propylene oxide content is from 50 to 95% by weight.

According to the present invention, alkylene oxide copolymers with other monomers preferably have ethylene oxide blocks. Other monomers can be, for example, butyl methacrylate (PBMA/PEO BE1010/BE1030, Th. Goldschmidt), methyl methacrylate (PMMA/PEO ME1010/ME1030, Th. Goldschmidt) or methacrylic acid (EA-3007, Th. Goldschmidt).

The surface-active compounds are generally not incorporated into the structure of the multimetal cyanide compounds nor bound in the form of a complex and can be washed out after the multimetal cyanide compounds have been prepared.

The aqueous cyanometalate solution preferably has an $M^2$ content of from 0.1 g/l to 100 g/l, preferably from 1 g/l to 20 g/l, particularly preferably from 5 g/l to 15 g/l.

The $M^1$ content of the metal salt solution is from 0.1% by weight to 10% by weight, preferably from 1% by weight to 5% by weight, based on the mass of metal salt solution.

In a preferred embodiment of the preparative process, the precipitation step is carried out by initially charging the cyanometalate solution and adding the metal salt solution. The amount of metal salt solution is chosen so that the multimetal cyanide precursor phase can be produced.

The temperature in the precipitation step is preferably in the range from 20 to 95° C., in particular from 35 to 80° C. The metal salt solution is preferably metered in over a period of from 5 minutes to 5 hours, in particular from 30 minutes to 3 hours.

The ratio of $M^1:M^2$ in the precipitation step is, depending on the desired precursor compound, from 1:1 to 3:1. In the preparation of multimetal cyanide compounds in which $M^1$ is Zn(II), $M^2$ is Co(III), and X is formate, acetate or propionate, preferably those in which X is acetate and which have a monoclinic crystal system, a zinc hexacyanocobaltate phase crystallizing in a cubic crystal system is precipitated in the precipitation step according to the present invention. In this case, the $M^1:M^2$ ratio is preferably 1.5:1.

The actually desired multimetal cyanide catalyst phase is then produced in the second process step as described above, also referred to as the recrystallization step. The recrystallization step can immediately follow the first process step, namely the precipitation step. However, the precipitation and recrystallization steps can also be separated from one another in space and/or time.

In the recrystallization step, the multimetal cyanide precursor phase prepared in the precipitation step is recrystallized to form the multimetal cyanide compound having the desired crystal structure by setting appropriate conditions.

The phases of the multimetal cyanide compounds which are present after the first step or the second step naturally have to differ in at least one measurable property, e.g. composition, X-ray diffraction pattern, morphology, particle size or agglomeration.

To set the conditions suitable for the recrystallization, alterations are made, for example, in the temperature and/or the pH of the precipitation suspension and/or the ratio $M^1:M^2$ (by addition of metal salt solution and/or cyanometalate solution). Changes in the ratio $M^1:M^2$ may also lead to changes in the absolute concentration of $M^1$ and $M^2$. The solutions added to change the ratio $M^1:M^2$ may also contain water-miscible substances such as ligands L and/or surface-active substances. Moreover, additional water-miscible substances such as the ligands L and/or surface-active substances can be added between the precipitation step and the recrystallization step.

In a further embodiment of the process of the present invention, it is possible to separate the multimetal cyanide precursor phase from the precipitation suspension and to resuspend the resulting solid for the recrystallization.

Furthermore, the metal salt solutions used in the precipitation and recrystallization do not have to be the same. They can differ either in the metal salt, the concentration or the possible addition of ligands L and/or surface-active substance. This applies equally to the cyanometalate solution. In this embodiment of the process of the present invention, it is possible for the metals in the multimetal cyanide compound to be partially exchanged.

In the recrystallization, either the compound from the precipitation step is resuspended in water and initially charged and, if a change in the $M^1:M^2$ ratio is necessary for the recrystallization, the appropriate amount of metal salt solution or cyanometalate solution is added, or the metal salt solution or cyanometalate solution is initially charged and the multimetal cyanide precursor phase dispersed in liquid is added. The addition can take from 2 minutes to 5 hours, preferably from 15 minutes to 2 hours.

The temperatures employed in the recrystallization are in the range from 20° C. to 95° C., preferably from 40° C. to 90° C. The temperature in the recrystallization is generally different from the temperature in the precipitation. However, should both precipitation and recrystallization be carried out at the same temperature, this is preferred for process engineering reasons.

The $M^1:M^2$ ratio in the recrystallization can be from 1:10 to 10:1, but is preferably from 1.5:1 to 3:1.

In the case of the preparation of the preferred multimetal cyanide catalyst phases in which $M^1$ is Zn(II), $M^2$ is Co(III), and X is acetate and which have a monoclinic crystal structure and are produced by recrystallization of a cubic precursor phase, the $M^1:M^2$ ratio in the recrystallization is greater than 1.9:1 and preferably in the range from 2:1 to 3:1. In this case, zinc acetate is used as metal salt.

In order to obtain the primary crystallites of this preferred multimetal cyanide catalyst phase in platelet form, fatty alcohol alkoxylates, preferably fatty alcohol ethoxylates, or ethylene oxide/propylene oxide block copolymers are preferably added as surface-active substances. The surface-active substances can be added either in the precipitation step or in the recrystallization step. The surface-active substances are preferably added after the precipitation step and before the recrystallization step.

The course of the recrystallization can, if macroscopically measurable parameters change, be followed by means of measurements. Such parameters may be the pH or the surface area of the solid. The change in the surface area of the solid can be followed by light scattering.

The multimetal cyanide catalysts prepared according to the present invention have a very low degree of agglomeration. 90% of the particles have a particle size (which can be determined by laser light scattering) in the range from 0.1 $\mu$m to 100 $\mu$m, preferably in the range from 0.1 $\mu$m to 30 $\mu$m, particularly preferably from 0.1 $\mu$m to 20 $\mu$m. The catalyst of the present invention has an X50 value of the measured particle size distribution of less than 20 $\mu$m, preferably less than 15 $\mu$m, in particular less than 10 $\mu$m.

The catalysts of the present invention are preferably used for preparing polyether alcohols having a functionality of from 1 to 8, preferably from 1 to 3, by ring-opening polymerization of alkylene oxides using OH-functional starters.

In the preparation of polyether alcohols, the catalysts are used in concentrations of less than 0.1% by weight, preferably less than 500 ppm, in particular less than 250 ppm, particularly preferably less than 100 ppm, in each case based on the resulting polyether alcohol.

As starter substances for the preparation of polyether alcohols using the DMC catalysts of the present invention, use is made of alcohols having a functionality of from 1 to 8. The functionality and the structure of the alcohols used as starters depends on the intended use of the polyether alcohols. Thus, in the case of polyether alcohols which are used for producing polyurethane elastomers, particular preference is given to using bifunctional alcohols. For preparing polyether alcohols used for producing flexible polyurethane foams, preferred starter substances are two- to four-functional alcohols. To prepare polyether alcohols which are used for producing rigid polyurethane foams, preference is given to using four- to eight-functional alcohols as starter substances. Starter substances used for the preparation of polyether alcohols in the presence of the catalysts of the present invention may also be reaction products of the abovementioned alcohols with alkylene oxides, in which case the latter reaction can be carried out using other catalysts, in particular alkaline catalysts such as potassium hydroxide.

Examples of alcohols which can be used as starter substances for the preparation of polyether alcohols are ethylene glycol, diethylene glycol, polyethylene glycol, propylene glycol, dipropylene glycol, polypropylene glycol, glycerol, glycerol alkoxylates, trimethylolpropane, trimethylolpropane alkoxylates, pentaerythritol, glucose and sucrose.

A further class of compounds which can be prepared using the catalysts of the present invention are addition products of alkylene oxides and long-chain alcohols, for example fatty alcohols. Such compounds are used, for example, as surfactants. Alkylene oxides used are usually aliphatic alkylene oxides having from 2 to 10 carbon atoms and/or styrene oxide, preferably ethylene oxide and/or propylene oxide.

The polyetherols prepared using the catalysts of the present invention have no high molecular weight tail, or a reduced high molecular weight tail, compared to polyetherols which have been prepared using multimetal cyanide catalysts which have not been prepared according to the present invention.

The reduction in the high molecular weight tail can readily be seen in the viscosity of a polyether alcohol, provided that the OH number and functionality of the polyethers to be compared are the same.

The invention is illustrated by the following examples.

EXAMPLE A

Preparation of Hexacyanocobaltic Acid:

7 l of strong acid ion exchange resin in the sodium form (Amberlite® 252 Na, Rohm & Haas) were placed in an ion exchange column (length 1 m, volume 7.7 l). The ion exchange resin was subsequently converted into the H form by passing 10% strength hydrochloric acid through the ion exchange column at a rate of 2 bed volumes per hour for 9 hours until the sodium content in the eluate was less than 1 ppm. The ion exchange resin was subsequently washed with water until neutral.

The regenerated ion exchange resin was then used for preparing an essentially alkali-free hexacyanocobaltic acid. For this purpose, a 0.24 molar solution of potassium hexacyanocobaltate in water was passed through the ion exchange resin at a rate of 1 bed volume per hour. After 2.5 bed volumes, the potassium hexacyanocobaltate solution was replaced by water. The 2.5 bed volumes obtained had a mean hexacyanocobaltic acid content of 4.5% by weight and alkali metal contents of less than 1 ppm.

The hexacyanocobaltic acid solutions used for the further examples were appropriately diluted with water.

Comparative Example 1

8071 g of aqueous zinc acetate dihydrate solution (zinc content: 2.6% by weight, content of Pluronic® PE 6200 (BASF AG): 1.2% by weight based on the zinc acetate solution) were placed in a 20 l stirred vessel equipped with an oblique-blade stirrer and were heated while stirring to 60° C. Subsequently, while stirring at a stirring power of 1 W/l, 9475 g of aqueous hexacyanocobaltic acid (cobalt content: 9 g/l, content of Pluronic® PE 6200: 1.2% by weight) which had likewise been heated to 60° C. was fed in over a period of 20 minutes. The precipitation suspension obtained in this way was stirred for another 60 minutes, then filtered and washed on the filter with 12 times the cake volume of water.

The X50 value of the particle sizes determined in the precipitation suspension by means of laser light scattering was 13 µm.

The X-ray diffraction pattern of the solid obtained in this way could be indexed according to the monoclinic crystal system. The particle habit was platelet-like according to electron micrographs and the primary particles were strongly agglomerated.

Part of the moist filter cake was subsequently dispersed in polypropylene glycol having a molar mass of 400 g/mol by means of an Ultraturrax®. The suspension obtained had a multimetal cyanide content of 5% by weight. The dispersed catalyst is designated as C1a.

Another part of the moist filter cake was dispersed in polypropylene glycol having a molar mass of 400 g/mol by means of a stirred ball mill (Drais Labormühle, disk stirrer, balls of silicon-aluminum-zirconium mixed oxide ceramic, ball diameter: 0.6–0.8 mm, dispersion time: 60 min). The suspension obtained had a multimetal cyanide content of 5% by weight. The X50 value of the particle sizes determined in the polypropylene glycol dispersion by means of laser light scattering was 2.2 µm. The dispersed catalyst is designated as C1b.

Comparative Example 2

1460 g of aqueous zinc acetate dihydrate solution (zinc content: 2.4% by weight, content of Pluronic® PE 6200 (BASF AG): 2.6% by weight based on the zinc acetate solution) were placed in a 3 l stirred vessel equipped with a Hoesch stirrer and were heated while stirring to 60° C. Subsequently, while stirring at a stirring power of 1 W/l, 1719 g of aqueous hexacyanocobaltic acid (cobalt content: 9 g/l, no Pluronic® PE 6200) which had likewise been heated to 60° C. was fed in over a period of 20 minutes. The precipitation suspension obtained in this way was stirred for another 60 minutes, then filtered and washed on the filter with 12 times the cake volume of water.

The X50 value of the particle sizes determined in the precipitation suspension by means of laser light scattering was 22 µm.

The moist filter cake had a multimetal cyanide content of 15.3% by weight.

The X-ray diffraction pattern of the solid obtained in this way could be indexed according to the monoclinic crystal system. The particle habit was platelet-like and the primary particles were strongly agglomerated.

The moist filter cake was subsequently dispersed in polypropylene glycol having a molar mass of 400 g/mol. The suspension obtained had a multimetal cyanide content of 5% by weight. The dispersed catalyst is designated as C2.

EXAMPLE 1

1724 g of aqueous hexacyanocobaltic acid (cobalt content (9 g/l, content of Pluronic® PE 6200: 1.2% by weight) were placed in a 3 l stirred vessel equipped with a Hoesch stirrer, a pH probe and a light scattering probe and were heated while stirring to 60° C. Subsequently, while stirring at a stirring power of 1 W/l, 1464 g of aqueous zinc acetate dihydrate solution (zinc content: 2.6% by weight, content of Pluronic® PE 6200 (BASF AG): 1.2% by weight based on the zinc acetate solution) which had likewise been heated to 60° C. were fed in over a period of 20 minutes. X-ray diffraction analysis of a sample taken at the end of the metered addition showed that the multimetal cyanide compound obtained had a cubic structure.

The precipitation suspension obtained in this way was then stirred at 60° C. for another 60 minutes. During this time, the pH dropped from 4.0 to 3.4. The solid was subsequently filtered off and washed on the filter with 12 times the cake volume of water.

The X50 value of the particle sizes determined in the precipitation suspension by means of laser light scattering was 7 μm.

The moist filter cake had a multimetal cyanide content of 20.8% by weight. The X-ray diffraction pattern of the solid obtained in this way could be indexed according to the monoclinic crystal system. The particle habit was platelet-like and the primary particles were only weakly agglomerated.

The moist filter cake was subsequently dispersed in polypropylene glycol having a molar mass of 400 g/mol. The suspension obtained had a multimetal cyanide content of 5% by weight. The dispersed catalyst is designated as 1.

EXAMPLE 2

537 g of aqueous hexacyanocobaltic acid (cobalt content (9.2 g/l, content of Pluronic® PE 6200: 1.2% by weight) were placed in a 1 l stirred vessel equipped with a Hoesch stirrer, a pH probe and a light scattering probe and were heated while stirring to 50° C. Subsequently, while stirring at a stirring power of 1 W/l, 476 g of aqueous zinc acetate dihydrate solution (zinc content: 2.6% by weight, content of Pluronic® PE 6200 (BASF AG): 1.2% by weight based on the zinc acetate solution) which had likewise been heated to 50° C. were fed in over a period of 20 minutes. X-ray diffraction analysis of a sample taken at the end of the metered addition showed that the multimetal cyanide compound had a cubic structure.

The precipitation suspension obtained in this way was then stirred at 50° C. for another 45 minutes. During this time, the pH dropped from 4.1 to 3.5. The solid was subsequently filtered off and washed on the filter with 6 times the cake volume of water.

The X50 value of the particle sizes determined in the precipitation suspension by means of laser light scattering was 4 μm.

The moist filter cake had a multimetal cyanide content of 18.9% by weight. The X-ray diffraction pattern of the solid obtained in this way could be indexed according to the monoclinic crystal system. The particle habit was platelet-like and the primary particles were only weakly agglomerated.

The moist filter cake was subsequently dispersed in polypropylene glycol having a molar mass of 400 g/mol. The suspension obtained had a multimetal cyanide content of 5% by weight. The dispersed catalyst is designated as 2.

EXAMPLE 3

16,500 g of aqueous hexacyanocobaltic acid (cobalt content: 8.2 g/l, content of Pluronic® PE 6200: 1.8% by weight) were placed in a 30 l stirred vessel equipped with a disk stirrer, immersed tube for introduction of metal salt solution, pH probe and light scattering probe and were heated while stirring to 50° C. Subsequently, while stirring at a stirring power of 1 W/l, 9013 g of aqueous zinc acetate dihydrate solution (zinc content: 2.5% by weight, content of Pluronic® PE 6200 (BASF AG): 1.8% by weight based on the zinc acetate solution) which had likewise been heated to 50° C. were fed in over a period of 45 minutes.

The zinc:cobalt ratio reached at this point in time, i.e. at the end of the precipitation, was 1.5:1. The solid present in the precipitation suspension at this point in time displayed an X-ray diffraction pattern which could be indexed according to the cubic crystal system.

The remaining 4387 g of aqueous zinc acetate dihydrate solution (zinc content: 2.5% by weight, content of Pluronic® PE 6200 (BASF AG): 1.8% by weight based on the zinc acetate solution) were then metered in over a period of 5 minutes while stirring at a stirring power of 1 W/l.

The molar zinc:cobalt ratio at this point in time was 2.23:1, and the pH was 3.94. The suspension was stirred for another hour. The pH dropped from 3.94 to 3.64 during this time and then remained constant. The precipitation suspension obtained in this way was subsequently filtered and the solid was washed on the filter with six times the cake volume of water.

The X50 value of the particle sizes determined in the precipitation suspension by means of laser light scattering was 4.5 μm.

The moist filter cake had a multimetal cyanide content of 18.9% by weight. The X-ray diffraction pattern of the solid obtained could be indexed according to the monoclinic crystal system. The particle habit was platelet-like and the primary particles were only weakly agglomerated.

The moist filter cake was subsequently dispersed in polypropylene glycol having a molar mass of 400 g/mol by means of a slotted rotor mill. The suspension obtained had a multimetal cyanide content of 5% by weight. The dispersed catalyst is designated as 3.

EXAMPLE 4

450 g of aqueous hexacyanocobaltic acid (cobalt content: 9 g/l) were placed in a 2 l stirred vessel equipped with a disk stirrer, immersed tube for introduction of the metal salt solution, pH probe and light scattering probe and were heated while stirring to 40° C. Subsequently, while stirring at a stirring power of 1 W/l, 264.34 g of aqueous zinc acetate dihydrate solution (zinc content: 2.55% by weight) which had likewise been heated to 40° C. were fed in over a period of 15 minutes. The molar zinc:cobalt ratio in the reactor was 1.5:1. The solid present in the precipitate suspension at this point in time displayed an X-ray diffraction pattern which could be indexed according to the cubic crystal system.

After taking samples for analysis, 597.7 g of DMC suspension remained in the apparatus.

7.17 g of Pluronic® PE 6200 (BASF AG) were added while stirring (1 W/l) to this suspension.

Subsequently, while stirring at a stirring power of 1 W/l, a further 107.87 g of aqueous zinc acetate dihydrate solution (zinc content: 2.55% by weight, content of Pluronic® PE 6200 based on the mass of zinc acetate solution: 1.2% by weight were metered in at 50° C. over a period of 5 minutes.

The molar zinc:cobalt ratio at this point in time was 2.23:1, and the pH was 3.9. The suspension was stirred for a further 1 hour. The pH dropped from 3.9 to 3.1 during this time and then remained constant. The precipitation suspension obtained in this way was subsequently filtered and the solid was washed on the filter with 6 times the cake volume of water.

The X50 value of the particle sizes determined in the precipitation suspension by means of laser light scattering was 6.6 μm.

The moist filter cake had a multimetal cyanide content of 25.4% by weight. The X-ray diffraction pattern of the solid obtained could be indexed according to the monoclinic crystal system. The particle habit was platelet-like and the primary particles were only weakly agglomerated.

The moist filter cake was subsequently dispersed in polypropylene glycol having a molar mass of 400 g/mol by means of an Ultraturrax®. The suspension obtained had a multimetal cyanide content of 5% by weight. The dispersed catalyst is designated as 4.

EXAMPLE 5

413 g of aqueous hexacyanocobaltic acid (cobalt content: 9 g/l) were placed in a 2 l stirred vessel equipped with a disk stirrer, immersed tube for introduction of the metal salt solution, pH probe and light scattering probe and were heated while stirring to 70° C. Subsequently, while stirring at a stirring power of 1 W/l, 238 g of aqueous zinc acetate dihydrate solution (zinc content: 2.6% by weight) which had likewise been heated to 70° C. were fed in over a period of 15 minutes. The molar zinc:cobalt ratio in the reactor was 1.5:1. The solid present in the precipitation suspension at this point in time displayed an X-ray diffraction pattern which could be indexed according to the cubic crystal system.

The suspension was drained from the reactor and transferred to a storage vessel. The reactor was then rinsed a number of times with water and dried.

92.7 g of aqueous zinc acetate dihydrate solution (zinc content: 2.6% by weight), 301.6 g of water and 4.73 g of Pluronic® PE 6200 were then placed in the reactor and were heated to 50° C. while stirring at a stirring power of 1 W/l. 510.4 g of the previously prepared DMC suspension which had likewise been heated to 50° C. were metered into this zinc acetate solution over a period of 20 minutes. The zinc/cobalt ratio at this point in time was 2.23:1.

The suspension was stirred for another two hours. The precipitation suspension obtained this way was subsequently filtered and the solid was washed on the filter with 6 times the cake volume of water.

The X50 value of the particle sizes determined in the precipitation suspension by means of laser light scattering was 9.6 μm.

The moist filter cake had a multimetal cyanide content of 25.4% by weight. The X-ray diffraction pattern of the solid obtained could be indexed according to the monoclinic crystal system. The particle habit was platelet-like and the primary particles were only weakly agglomerated.

The moist filter cake was subsequently dispersed in polypropylene glycol having a molar mass of 400 g/mol by means of an Ultraturrax®. The suspension obtained had a multimetal cyanide content of 5% by weight. The dispersed catalyst is designated as 5.

EXAMPLE 6

16000 g of aqueous hexacyanocobaltic acid (cobalt content: 9 g/l) were placed in a 30 l stirred vessel equipped with a propeller stirrer, immersed tube for introduction of the metal salt solution, pH probe and light scattering probe and were heated while stirring to 50° C. Subsequently, while stirring at a stirring power of 0.4 W/l, 9224 g of aqueous zinc acetate dihydrate solution (zinc content: 2.6% by weight) which had likewise been heated to 50° C. were metered in over a period of 15 minutes.

The molar zinc:cobalt ratio reached at this point in time, i.e. at the end of the precipitation, was 1.5:1. The solid present in the precipitation suspension at this point in time displayed an X-ray diffraction pattern which could be indexed according to the cubic crystal system.

351 g of Pluronic® PE 6200 (BASF AG) were added to this precipitation suspension and the mixture was stirred for another 10 minutes.

A further 3690 g of aqueous zinc acetate dihydrate solution (zinc content: 2.6% by weight) were subsequently metered in over a period of 5 minutes while stirring at a stirring power of 0.4 W/l.

The molar zinc:cobalt ratio at this point in time was 2.1:1, and the pH was 4.02. The suspension was stirred for another two hours. The pH dropped from 4.02 to 3.27 during this time and then remained constant. The precipitation suspension obtained in this way was subsequently filtered and the solid was washed on the filter with 6 times the cake volume of water.

The X50 value of the particle sizes determined in the precipitation suspension by means of laser light scattering was 8.0 μm.

The moist filter cake had a multimetal cyanide content of 17.9% by weight. The X-ray diffraction pattern of the solid obtained could be indexed according to the monoclinic crystal system. The particle habit was platelet-like and the primary particles were only weakly agglomerated.

5586 g of moist filter cake were placed in a 30 l reactor equipped with a disk stirrer. 19 kg of Tridekanol® N (BASF AG) were added thereto and the solid was dispersed by stirring. The suspension was subsequently heated to 80° C. and the water was distilled from the suspension over a period of 8 hours by application of vacuum.

The multimetal cyanide compound suspended in Tridekanol® N was subsequently dispersed once more by means of a slotted rotor mill. The suspension obtained had a multimetal cyanide content of 5% by weight. The dispersed catalyst is designated as 6.

EXAMPLE 7

400 g of hexacyanocobaltic acid (cobalt content: 9 g/l) and 4.8 g of Pluronic® PE 6200 (BASF AG) were placed in a 1.5 l glass beaker equipped with thermometer, pH meter and screw stirrer and were heated to 50° C. while stirring at 450 rpm. Subsequently, while stirring at 50° C., 275.6 g of an aqueous solution of zinc(II) acetate and manganese(II) acetate (zinc content: 1.1% by weight, manganese content: 0.91% by weight, molar zinc/manganese ratio: 1:1, content of Pluronic® PE 6200: 1.2% by weight) which had likewise been heated to 50° C. were fed in. The pH at the end of the metered addition was 2.97.

The suspension and the zinc/manganese solution were then heated to 70° C.

Subsequently, a further 147 g of the aqueous zinc(II) acetate/manganese(II) acetate solution were metered into the suspension. The pH of the suspension at the end of the metered addition was 4.28.

The suspension was stirred at 70° C. for 1 hour, during which time the pH dropped from 4.28 to 4.02.

The colorless solid was filtered off and washed with 6 times the cake volume of water.

The X-ray diffraction pattern of the solid obtained could be indexed according to the monoclinic crystal system. The particle habit was platelet-like. The zinc(II) in the solid was able to be partly replaced by manganese(II).

EXAMPLE 8

400 g of hexacyanocobaltic acid (cobalt content: 9 g/l) and 4.8 g of Pluronic® PE 6200 (BASF AG) were placed in a 1.5 l glass beaker equipped with thermometer, pH meter and screw stirrer and were heated to 50° C. while stirring at 450 rpm. Subsequently, while stirring at 50° C., 288 g of an aqueous solution of zinc(II) acetate and iron(II) acetate (zinc content: 1.56% by weight, iron content: 0.44% by weight, molar zinc/iron ratio: 3:1, content of Pluronic® PE 6200: 1.2% by weight) which had likewise been heated to 50° C. were fed in. The pH at the end of the metered addition was 2.44.

The suspension and the zinc/iron solution were heated to 75° C. A further 154 g of the aqueous zinc(II) acetate/iron(II) acetate solution were subsequently metered in. The pH of the suspension at the end of the metered addition was 4.22. After 1.5 hours, the temperature was increased to 80° C. and the suspension was stirred for another hour. During this hour, the pH of the suspension dropped from 4.22 to 3.88.

The brownish solid was filtered off and washed with 6 times the cake volume of water.

The X-ray diffraction pattern of the solid obtained could be indexed according to the monoclinic crystal system. The particle habit was platelet-like. The zinc(II) in the solid was able to be partly replaced by iron(II).

EXAMPLE 9

400 g of hyexacyanocobaltic acid (cobalt content: 9 g/l) and 4.8 g of Pluronic® PE 6200 (BASF AG) were placed in a 1.5 l glass beaker equipped with thermometer, pH meter and screw stirrer and were heated to 50° C. while stirring (450 rpm). Subsequently, while stirring at 50° C., 276.3 g of an aqueous solution of zinc(II) acetate and cobalt(II) acetate (zinc content: 2.0% by weight, cobalt content: 0.18% by weight, molar zinc/cobalt ratio: 10:1, content of Pluronic® PE 6200: 1.2% by weight) which had likewise been heated to 50° C. were fed in. The pH at the end of the metered addition was 3.53.

A further 145.6 g of the aqueous zinc(II) acetate/cobalt(II) acetate solution were subsequently metered in. The pH of the pink suspension obtained in this way was 4.34 at the end of the metered addition.

After stirring for 1 hour at 50° C., the temperature of the suspension was increased to 60° C. and another hour later was increased to 65° C. At 65° C., the suspension was stirred for a further 3 hours. During this time, the pH of the suspension dropped from 4.34 to 4.11. The color of the suspension changed from pink to violet-blue.

The violet-blue solid was filtered off and washed with 6 times the cake volume of water.

The X-ray diffraction pattern of the solid obtained could be indexed according to the monoclinic crystal system. The particle habit was platelet-like. The zinc(II) in the solid was able to be partly replaced by cobalt(II).

EXAMPLE 10

400 g of hexacyanocobaltic acid (cobalt content: 9 g/l) and 4.8 g of Pluronic® PE 6200 (BASF AG) were placed in a 1.5 l glass beaker equipped with thermometer, pH meter and screw stirrer and were heated to 50° C. while stirring at 450 rpm. Subsequently, while stirring at 50° C., 297.4 g of an aqueous solution of zinc(II) acetate and copper(II) acetate (zinc content: 1.51% by weight, copper content: 0.49% by weight, molar zinc/copper ratio: 3:1, content of Pluronic® PE 6200: 1.2% by weight) which had likewise been heated to 50° C. were fed in. The pH at the end of the metered addition was 2.32.

A further 158.6 g of the aqueous zinc(II) acetate/copper (II) acetate solution were subsequently metered in. The pH of the suspension was 4.16 at the end of the metered addition.

After 2 hours, the temperature was increased to 70° C. and after another hour to 75° C. and the suspension was stirred for a further hour. During this hour, the pH of the suspension dropped from 4.16 to 4.10.

The turquoise colorant was filtered off and washed with 6 times the cake volume of water.

The X-ray diffraction pattern of the solid obtained in this way displayed a major phase which could be indexed according to the monoclinic crystal system and a minor phase which could be indexed according to the cubic crystal system. The particle habit of the major phase was platelet-like and the particle habit of the minor phase was spherical. The zinc(II) in the solid was able to be partly replaced by copper(II).

Preparation of Polyether Alcohols

Comparative Example 3

The synthesis was carried out in a clean and dry 1 l stirring autoclave. 92 g of a propoxylated glycerol having a molecular weight $M_w$ of 400 and 8 g of propoxylated ethylene glycol having a molar mass of 250 g/mol were placed in the stirred vessel and admixed with 100 ppm of multimetal cyanide catalyst C1a (corresponds to 1.64 g of catalyst suspension). The contents of the reactor were made inert by means of nitrogen and evacuated for a total of 1 hour at 125° C. At 125° C., firstly 160 g of propylene oxide and then 470 g of a mixture of 390 g of propylene oxide and 80 g of ethylene oxide were metered in over a period of 35 minutes. 90 g of propylene oxide were subsequently added on. The mixture was stirred for another 3 hours and degassed at 125° C. and 9 mbar. The product was worked up by filtration. The resulting polyether alcohol had the following properties:

| | |
|---|---|
| Hydroxyl number: | 44.85 mg KOH/g; |
| Viscosity at 25° C.: | 3239 mPas; |
| Zn/Co content: | 32.5/14.7 ppm |

Comparative Example 4

The synthesis was carried out in a clean and dry 1 l stirring autoclave. 92 g of a propoxylated glycerol having a molecular weight $M_w$ of 400 and 8 g of propoxylated ethylene glycol having a molecular weight $M_w$ of 250 g/mol were placed in the stirred vessel and admixed with 100 ppm of multimetal cyanide catalyst C1b (corresponds to 0.83 g of catalyst suspension). The contents of the reactor were made inert by means of nitrogen and evacuated for a total of 1 hour at 122° C. and 0.02 bar of nitrogen. At 120° C., firstly, 160 g of propylene oxide and then 470 g of a mixture of 390 g of propylene oxide and 80 g of ethylene oxide were metered in over a period of 35 minutes. 90 g of propylene oxide were subsequently added on. The mixture was stirred for another 2 hours and degassed at 125° C. and 10 mbar. The product was worked up by filtration. The resulting polyether alcohol had the following properties:

| | |
|---|---|
| Hydroxyl number: | 47.48 mg KOH/g; |
| Viscosity at 25° C.: | 1932 mPas; |
| Zn/Co content: | 16.2/8.5 ppm |

Comparative Example 5

The synthesis was carried out in a clean and dry 1 l stirring autoclave. 92 g of a propoxylated glycerol having a molecular weight $M_w$ of 400 and 8 g of propoxylated ethylene glycol having a molar mass of 250 g/mol were placed in the stirred vessel and admixed with 100 ppm of multimetal cyanide catalyst C 2 (corresponds to 0.82 g of catalyst suspension). The contents of the reactor were made inert by means of nitrogen and evacuated for a total of 1 hour at 125° C. and 0.08 bar of nitrogen. At 120° C., firstly 160 g of propylene oxide and then 470 g of a mixture of 390 g of propylene oxide and 80 g of ethylene oxide were metered in over a period of 57 minutes. 90 g of propylene oxide were subsequently added on. The mixture was stirred for another 4 hours and degassed at 125° C. and 9 mbar. The product was worked up by filtration. The resulting polyether alcohol had the following properties:

| | |
|---|---|
| Hydroxyl number: | 45.36 mg KOH/g; |
| Viscosity at 25° C.: | 2782 mPas; |
| Zn/Co content: | 9.6/5.5 ppm |

EXAMPLE 11

The synthesis was carried out in a clean and dry 1 l stirring autoclave. 92 g of a propoxylated glycerol having a molecular weight $M_w$ of 400 and 8 g of propoxylated ethylene glycol having a molecular weight $M_w$ of 250 g/mol were placed in the stirred vessel and admixed with 100 ppm of multimetal cyanide catalyst 1 (corresponds to 0.82 g of catalyst suspension). The contents of the reactor were made inert by means of nitrogen and evacuated ated for a total of 1 hour at 125° C. and 0.1 bar of nitrogen. At 125° C. firstly 160 g of propylene oxide and then 470 g of a mixture of 390 g of propylene oxide and 80 g of ethylene oxide were metered in over a period of 20 minutes. 90 g of propylene oxide were subsequently added on. The mixture was stirred for another 2 hours and degassed at 125° C. and 11 mbar. The product was worked up by filtration. The resulting polyether alcohol had the following properties:

| | |
|---|---|
| Hydroxyl number: | 46.9 mg KOH/g; |
| Viscosity at 25° C.: | 1223 mPas; |
| Zn/Co content: | 3.1/<2 ppm |

EXAMPLE 12

The synthesis was carried out in a clean and dry 1 l stirring autoclave. 92 g of a propoxylated glycerol having a molecular weight $M_w$ of 400 and 8 g of propoxylated ethylene glycol having a molecular weight $M_w$ of 250 g/mol were placed in the stirred vessels and admixed with 100 ppm of multimetal cyanide catalyst 2 (corresponds to 1.64 g of catalyst suspension). The contents of the reactor were made inert by means of nitrogen and evacuated for a total of 1 hour at 125° C. and 0.1 bar of nitrogen. At 125° C. firstly 160 g of propylene oxide and then 470 g of a mixture of 390 g of propylene oxide and 80 g of ethylene oxide were metered in over a period of 35 minutes. 90 g of propylene oxide were subsequently added on. The mixture was stirred for another 2 hours and degassed at 125° C. and 9 mbar. The product was worked up by filtration. The resulting polyether alcohol had the following properties:

| | |
|---|---|
| Hydroxyl number: | 46.5 mg KOH/g; |
| Viscosity at 25° C.: | 720 mPas; |
| Zn/Co content: | 6.1/2.9 ppm |

EXAMPLE 13

The synthesis was carried out in a clean and dry 1 l stirring autoclave. 92 g of a propoxylated glycerol having a molecular weight $M_w$ of 400 and 8 g of propoxylated ethylene glycol having a molecular weight $M_w$ of 250 g/mol were placed in the stirred vessel and admixed with 100 ppm of multimetal cyanide catalyst 3 (corresponds to 1.86 g of catalyst suspension). The contents of the reactor were made inert by means of nitrogen and evacuated for a total of 1 hour at 125° C. and 0.1 bar of nitrogen. At 125° C. firstly 160 g of propylene oxide and then 470 g of a mixture of 390 g of propylene oxide and 80 g of ethylene oxide were metered in over a period of 55 minutes. 90 g of propylene oxide were subsequently added on. The mixture was stirred for another 1 hour and degassed at 125° C. and 12 mbar. The product was worked up by filtration. The resulting polyether alcohol had the following properties:

| | |
|---|---|
| Hydroxyl number: | 48.3 mg KOH/g; |
| Viscosity at 25° C.: | 662 mPas; |
| Zn/Co content: | 9.8/4.6 ppm |

EXAMPLE 14

The synthesis was carried out in a clean and dry 1 l stirring autoclave. 92 g of a propoxylated glycerol having a molecular weight $M_w$ of 400 and 8 g of propoxylated ethylene glycol having a molar mass of 250 g/mol were placed in the stirred vessel and admixed with 100 ppm of multimetal cyanide catalyst 4 (corresponds to 1.64 g of catalyst suspension). The contents of the reactor were made inert by means of nitrogen and evacuated for a total of 1 hour at 125° C. and 0.1 bar of nitrogen. At 120° C. firstly 160 g of propylene oxide and then 470 g of a mixture of 390 g of propylene oxide and 80 g of ethylene oxide were metered in over a period of 50 minutes. 90 g of propylene oxide were subsequently added on. The mixture was stirred for another 2 hours and degassed at 125° C. and 13 mbar. The product was worked up by filtration. The resulting polyether alcohol had the following properties:

| | |
|---|---|
| Hydroxyl number: | 49.8 mg KOH/g; |
| Viscosity at 25° C.: | 603 mPas; |
| Zn/Co content: | <2/<2 ppm |

EXAMPLE 15

The synthesis was carried out in a clean and dry 1 l stirring autoclave. 92 g of a propoxylated glycerol having a molecular weight $M_w$ of 400 and 8 g of propoxylated ethylene glycol having a molecular weight $M_w$ of 250 g/mol were placed in the stirred vessel and admixed with 100 ppm of multimetal cyanide catalyst 5 (corresponds to 1.64 g of catalyst suspension). The contents of the reactor were made inert by means of nitrogen and evacuated for a total of 1 hour at 125° C. and 0.1 bar of nitrogen. At 125° C. firstly 160 g of propylene oxide and then 470 g of a mixture of 390 g of propylene oxide and 80 g of ethylene oxide were metered in over a period of 45 minutes. 90 g of propylene oxide were subsequently added on. The mixture was stirred for another 2 hours and degassed at 125° C. and 9 mbar. The product was worked up by filtration. The resulting polyether alcohol had the following properties:

| Hydroxyl number: | 47.1 mg KOH/g; |
|---|---|
| Viscosity at 25° C.: | 939 mPas; |
| Zn/Co content: | 3.0/<2 ppm |

EXAMPLE 16

310 g of Tridekanol® N and 1.65 g (50 ppm) of a 5% strength double metal cyanide suspension in Tridekanol® N (catalyst 6) were placed in a 5 l reactor and the reactor was flushed twice with nitrogen. The reactor was then heated to 105° C.–115° C. and the contents were dewatered at 20 mbar for 2 hours. The vacuum was subsequently broken by means of nitrogen and the reactor was flushed three times with nitrogen. Nitrogen was subsequently admitted to a pressure of 0.5–1.0 bar and the reactor was heated to 135° C.–150° C. Under these conditions, 1349 g of propylene oxide were added. The after-reaction time was about 1–2 hours. The reactor was cooled to 100° C. and the contents were degassed at this temperature and 20 mbar for 2 hours. The reactor was then cooled to 60° C. and the product was taken out.

The yield was 1646 g.

The catalyst was subsequently filtered off by means of a pressure filter using a deep-bed filter (K 150).

The reaction product obtained had the following properties:

| Hydroxyl number: | 53 mg KOH/g |
|---|---|
| Kinematic viscosity at 40° C. (DIN 51562): | 56.2 mm$^2$/s |
| Water content (DIN 51777): | 0.07% |
| Density (DIN 51757): | 0.9660 g/cm$^3$ |
| Zn: | <1 ppm |
| Co: | <1 ppm |

The hydroxyl numbers were determined in accordance with DIN 51562, the viscosity in Examples 11 to 15 and Comparative Examples 3 to 5 was determined in accordance with DIN 53015 and the zinc and cobalt contents were determined by means of atomic absorption spectroscopy.

We claim:

1. A process for preparing multimetal cyanide compounds comprising the steps of
   (a) precipitating a multimetal cyanide compound by reaction of a metal salt with a cyanometalate compound and
   (b) recrystallizing the multimetal cyanide compound precipitated in step a) by
      b(i) adding further metal salt to the reaction product from step a), and/or
      b(ii) adding further cyanometalate compound.

2. A process as claimed in claim 1, wherein, in step a), the solution of the cyanometalate is initially charged and the solution of the metal is added thereto.

3. A process as claimed in claim 1, wherein the step a) and/or b) are/is carried out in the presence of at least one surface-active substance.

4. A process as claimed in claim 3, wherein the surface-active substance is selected from the group consisting of anionic, cationic, nonionic and/or polymeric surfactants.

5. A process as claimed in claim 1, wherein the cyanometalate compound comprises a cyanometallic acid.

* * * * *